(12) United States Patent  (10) Patent No.: US 7,664,869 B2
Baker et al.  (45) Date of Patent: Feb. 16, 2010

(54) WEB INTERFACE TO A DEVICE AND AN ELECTRICAL NETWORK CONTROL SYSTEM

(75) Inventors: Richard A Baker, West Newbury, MA (US); Jean-Marc Rolland, Le Versoud (FR)

(73) Assignee: Schneider Automation Inc., North Andover, MA (US)

( * ) Notice: Subject to any disclaimer, the term of this patent is extended or adjusted under 35 U.S.C. 154(b) by 265 days.

(21) Appl. No.: 11/933,317

(22) Filed: Oct. 31, 2007

(65) Prior Publication Data

US 2008/0104189 A1 May 1, 2008

Related U.S. Application Data

(63) Continuation of application No. 09/738,433, filed on Dec. 15, 2000, now abandoned, which is a continuation-in-part of application No. 09/595,159, filed on Jun. 15, 2000, now Pat. No. 6,732,191, which is a continuation-in-part of application No. 08/927,005, filed on Sep. 10, 1997, now Pat. No. 6,282,454.

(51) Int. Cl.
 *G06F 15/16* (2006.01)
(52) U.S. Cl. .............. 709/230; 709/217; 709/218; 709/219; 709/220; 709/229; 709/227
(58) Field of Classification Search .............. None
 See application file for complete search history.

(56) References Cited

U.S. PATENT DOCUMENTS

| | | | | |
|---|---|---|---|---|
| 5,862,391 A * | 1/1999 | Salas et al. | ........ | 713/300 |
| 5,872,919 A * | 2/1999 | Wakeland | ........ | 709/230 |
| 5,903,559 A * | 5/1999 | Acharya et al. | ........ | 370/355 |
| 5,918,018 A * | 6/1999 | Gooderum et al. | ........ | 709/225 |
| 6,003,084 A * | 12/1999 | Green et al. | ........ | 709/227 |
| 6,151,625 A * | 11/2000 | Swales et al. | ........ | 709/218 |
| 6,282,454 B1 * | 8/2001 | Papadopoulos et al. | ........ | 700/83 |
| 6,327,511 B1 * | 12/2001 | Naismith et al. | ........ | 700/19 |
| 6,587,884 B1 * | 7/2003 | Papadopoulos et al. | ........ | 709/230 |
| 6,732,191 B1 * | 5/2004 | Baker et al. | ........ | 710/1 |
| 6,792,337 B2 * | 9/2004 | Blackett et al. | ........ | 700/295 |
| 6,826,590 B1 * | 11/2004 | Glanzer et al. | ........ | 709/200 |
| 6,842,454 B2 * | 1/2005 | Metcalf, III | ........ | 370/392 |
| 6,963,922 B2 * | 11/2005 | Papadopoulos et al. | ........ | 709/230 |
| 7,035,898 B1 * | 4/2006 | Baker | ........ | 709/203 |
| 7,051,143 B2 * | 5/2006 | White et al. | ........ | 710/305 |
| 7,058,693 B1 * | 6/2006 | Baker, Jr. | ........ | 709/217 |
| 7,162,510 B2 * | 1/2007 | Jammes | ........ | 709/203 |
| 2002/0091784 A1 * | 7/2002 | Baker et al. | ........ | 709/208 |
| 2003/0195975 A1 * | 10/2003 | Papadopoulos et al. | ........ | 709/230 |

* cited by examiner

*Primary Examiner*—David E England

(57) ABSTRACT

A method and interface module for communicating messages with a remote location and to provide access to an at least one intelligent electronic device (IED) operably connected to a communication network. The interface module is comprised of a central processing unit and an operating system operating the central processing unit. A network interface is operably connected with the communication network. A protocol task processes communication on the network according to first and second protocol stacks, wherein messages are assigned to either the first or second protocol stack. Messages assigned to the first protocol stack have a higher priority than messages assigned to the second protocol stack. A set of application tasks communicates with the protocol task for responding to an incoming message from the communication network and initiating an outgoing message to the communication network. An interconnection bus with an interface driver is operably connected with the at least one IED.

43 Claims, 5 Drawing Sheets

WEB INTERFACE TO A DEVICE AND AN ELECTRICAL NETWORK CONTROL SYSTEM

RELATED APPLICATIONS

This application is a continuation of U.S. patent application Ser. No. 09/738,433, filed on Dec. 15, 2000, entitled "A Web Interface To A Device And An Electrical Network Control System", which is a continuation-in-part of U.S. patent application Ser. No. 09/595,159, now U.S. Pat. No. 6,282,454 filed on Jun. 15, 2000, entitled "Web Interface to An Input/Output Device (SAA-35), which is a continuation-in-part of U.S. patent application Ser. No. 08/927,005, now U.S. Pat. No. 6,732,191 filed on Sep. 10, 1997, entitled "Web Interface To A Programmable Controller." This application is also related to the following, commonly assigned applications entitled, "Messaging Application Layer (MODBUS) Over Ethernet To Transport Layer (TCP) Communications Method and Apparatus For a Modular Terminal Input/Output System," U.S. patent application Ser. No. 09/166,870, now U.S. Pat. No. 6,233,626 filed Oct. 6, 1998; "Web Interface To A Programmable Controller," U.S. patent application Ser. No. 09/303,458, now U.S. Pat. No. 6,151,625 filed Apr. 30, 1999; "Interface To A Programmable Logic Controller," U.S. patent application Ser. No. 09/223,349, now U.S. Pat. No. 6,853,867 filed Dec. 30, 1998; and "Communications System For A Control System Over Ethernet And IP Networks And Communication Interfaces For Such Systems," U.S. Patent Application 60/078,223, filed Mar. 16, 1998. The contents of these Applications are expressly incorporated herein by reference.

TECHNICAL FIELD

The present invention relates generally to the field of protection, monitoring and controlling devices and modules for an electrical network control systems. More particularly, the present invention relates to a system for coupling protection, monitoring and controlling devices and modules to a Web server.

BACKGROUND OF THE INVENTION

Remote monitoring and control of Substation Automation systems (SAS), and protection, monitoring and controlling devices has taken many forms. In the past, dedicated lines were the common form of communication between a control system and a remote location. This type of communication had limited application since the control system was not accessible from multiple locations. Modems have made it possible to access the control system from different locations, but this type of access required implementing generally specific communication protocols. Providing any type of control function between locations is rather limited in this type of environment. Furthermore, a customized interface is generally required to access the control system by an end user.

With the growth of Internet and its World Wide Web providing a delivery platform for organizing Internet data through hypertext links, a client server system can be designed that will give each end user the same type of user friendly interface and universal access to services on the Web. The Web is a network of documents called sites or pages stored on server computers throughout the world. Each page typically contains text, multimedia offerings, i.e., graphic images, video, or audio; and hypertext links to other Web pages or documents. A browser allows a user to read and interact with the Web page. The browser is a graphical software program that sends commands to the Internet Web site and displays whatever information is available on the page. As is well known, various browser programs are commercially available from different manufacturers.

The Internet network employs methods designed to handle many general-purpose computers sharing a single cable, and therefore has no ability to differentiate traffic in terms of its purpose or the criticality of its data. The Internet is no longer a network of computers sharing a single cable, but rather a web of interconnected point to point links involving both general purpose stations and specialized infrastructure components such as routers and firewalls.

Most personal computers or work stations can be used by the end user to connect to the Web through the commercially available browsers. Communication over the Internet and other networks requires one or several available protocols. Protocols such as Internet Protocol (IP) provide for file transfers, electronic mail, and other services. Commercially available programming languages such as Java or ActiveX, along with Hypertext Markup Language (HTML) and Extensive Markup Language (XML), are used in designing layouts and graphics for a Web site or page and have extended Internet technology such that a Web site can be used for dynamic applications, e.g., applets or plug ins, that can be downloaded and run by the end user.

Many manufacturers provide automation information using dedicated hardware and software with private communication networking environments. Numerical protection units, electronic meters, fault detectors, substation control units and Remote Terminal Units (RTU) are widely used in control network systems. In addition to these devices, monitoring and controlling modules for smart power equipment (e.g. intelligent circuit breaker, switch gear and power transformer) may also be integrated in process control systems. Such specialized environments can be very expensive. Furthermore, these systems are based on proprietary communications busses and conversion products are required to allow information carried over those networks to be visible on a general-purpose network. There are significant installation and other deployment costs associated with the existence of such intermediate devices.

It would be desirable to develop an electrical network control system whereby a user could use general purpose communication networks, such as the Internet and specialized industrial networks, directly connected to intelligent power equipment, protection units, electronic meters, fault detectors, substation control units and RTUs for remote monitoring and control access.

This invention is designed to solve these and other problems.

SUMMARY OF THE INVENTION

Accordingly, an object of the present invention is to provide an interface between an electrical network control system and a Web browser coupled to a communication network such as the Internet.

Another object of the invention is directed to an interface module for communicating messages with a remote location and to provide access to an at least one intelligent electronic device (IED) operably connected to a communication network. The interface module is comprised of a central processing unit and an operating system operating the central processing unit. A network interface is operably connected with the communication network. A protocol task processes communication on the network according to first and second protocol stacks, wherein messages are assigned to either the first or second protocol stack. Messages assigned to the first protocol stack have a higher priority than messages assigned to the second protocol stack. A set of application tasks communicates with the protocol task for responding to an incoming message from the communication network and initiating an outgoing message to the communication network. An interconnection bus with an interface driver is operably connected with the at least one IED.

A further objection of the invention is to provide remote access through a Web browser to an Intelligent Electronic Device (IED), i.e., intelligent power equipment, protection units, electronic meters, fault detectors, substation control units, RTUs and smart power equipment such as intelligent circuit breakers, switch gears and power transformers.

The present invention allows for easy access over a commercial network such as the Internet to information within at least one IED. Access can be made locally or worldwide using a commercial Web browser. The invention is comprised of a control system of essential elements comprising a Web interface, a local network, and a network interface to at least one IED.

The Web interface runs Web pages from an embedded interface module coupled to the main IED processor board. The Web interface module includes a network driver, a Transmission Control Protocol/Internet Protocol (TCP/IP) stack, a hypertext transfer protocol (HTTP) interpreter, a file transfer protocol (FTP) server, and an interface driver to the IED.

The Web interface provides access to the IED by a user at a remote location through the Internet. The interface translates the TCP/IP, FTP and HTTP protocols used on the Internet into data recognizable to the IED. Using this interface, the user can retrieve all pertinent data regarding the operation of the IED and the related process, i.e., configuration data; operating statistics; diagnoses; and data from the process of the primary equipment, such as input/output status, measurements, alarms, event records, disturbance/fault records, power quality data and predictive maintenance information.

The user can also modify parameters and send controls to the IED. Updates to operating software can also be downloaded through the Internet access and the FTP protocol. In the preferred embodiment of the invention to a SAS, the IED is connected to an Ethernet local network and the network driver is an Ethernet driver.

Another object of the invention also allows for access to smaller control systems such as pole-top control systems. For such simple systems, the IED can be connected to regular telephone wires using a phone modem wherein the network driver is a PPP (Point-To-Point Protocol) or SLIP (Serial Line Internet Protocol) driver.

Yet a further object of the invention is a method of communicating with an intelligent electronic device operably connected to a communication network. The method comprises the steps of utilizing a web browser to contact the intelligent electronic device.

Information is obtained from the intelligent electronic device using a protocol and programming language. Information may also be sent to the intelligent electronic device from the web browser. For instance, various protocols, i.e., HTML, SGML, XML, etc. cooperate with known or yet to be developed programming languages and technologies such as Java, ActiveX, etc., to communicate with the IED. The IED can also be controlled in this manner from the web browser.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
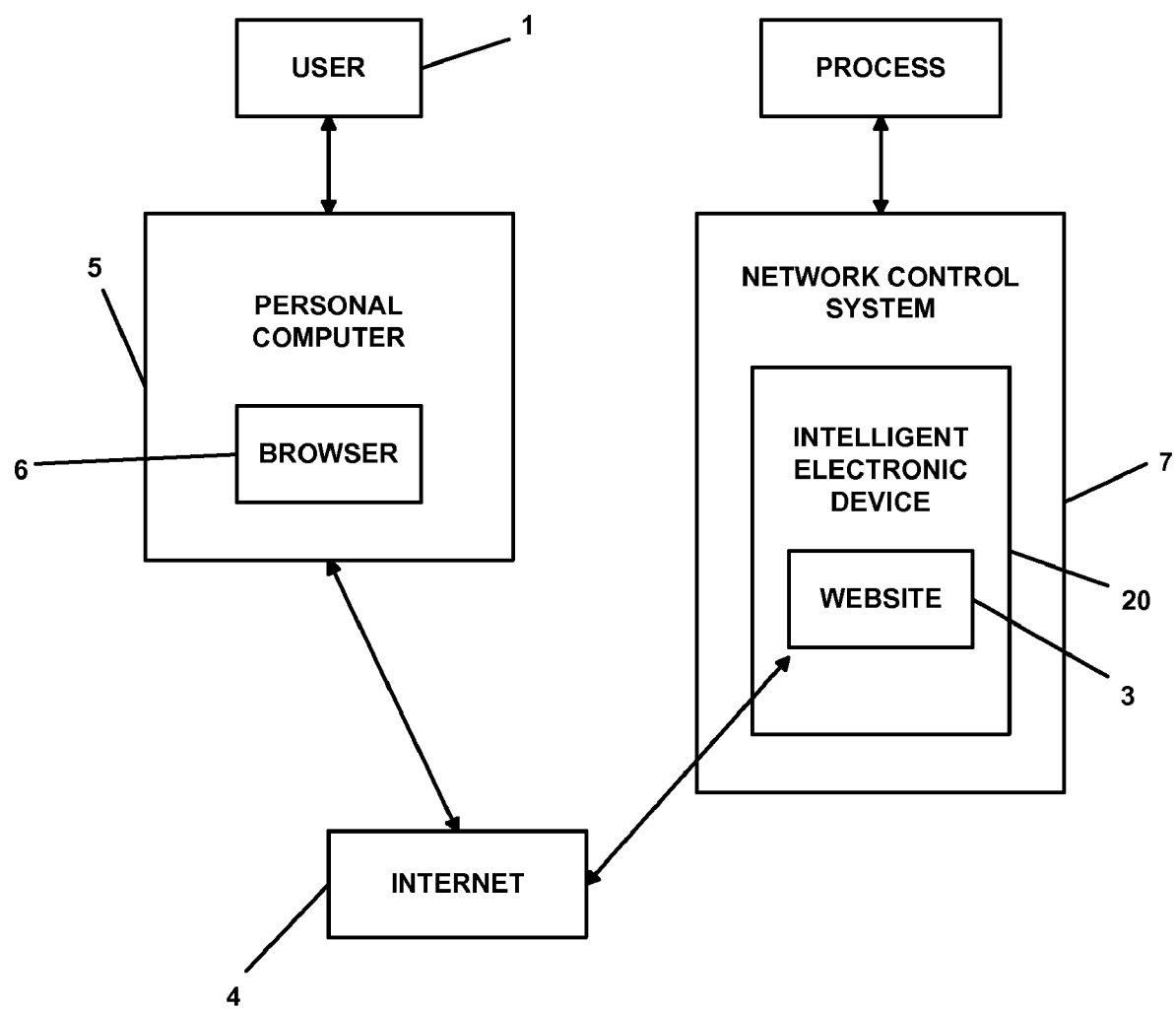
FIG. 1 is an overview block diagram illustrating the relationship between a user at a remote location and an Internet Web site embedded in a control system and used for monitoring and operating on an electrical network control system, according to the present invention.

FIG. 1 shows an overview block diagram illustrating the relationship between a user 1 at a remote location and an Internet Web site 3 embedded in a control system 7 used for monitoring and operating a process.

The user 1 will have a personal computer (PC) 5 having a commercially available browser 6, such as Netscape Communication's Navigator or Microsoft's Internet Explorer, installed for viewing the contents at the Web site through a communication network, such as the Internet 4. The PC 5 provides a remote human-machine interface (HMI) to the electrical network control system 7. Various interconnection services are readily available to provide the physical and electrical interconnection from the PC 5 to the Internet 4 itself. The Internet 4 is a collection of independent worldwide communication networks that are interconnected to each other and function as a single connectionless entity. Communication is based on a client-server basis, using a number of established protocols that allow for communication and file transfers between the client and the server. One of the most widely used protocols is Internet Protocol (IP). The applications layer protocol interface to the Web browser is typically through the HTTP protocol using the HTML, XML, JAVA, or ActiveX language. File transfers are typically implemented through the FTP protocol.

The user 1 can connect to the Internet 4 using one of a number of Internet service providers and will enter the address of the Web site 3 when connected. The Web site 3 will display a home page which may contain text, some type of multimedia offers such as graphic images, video, or audio, and possible hypertext links to other Web sites or documents. Trouble shooting instructions, maintenance logs, repair diagnostic information, quality control parameters, etc., reside within the Web site 3 for convenient access by the user. The browser 6 allows the user 1 to read and interact with the page. The browser 6 will send commands to the Web site 3 which will interact with an intelligent electronic device (IED) 20 and display the information available from the electrical network control system 7, concerning the process and the control systems itself. The browser 6 facilitates human interaction with the electrical network control system 7.

Figure 2:
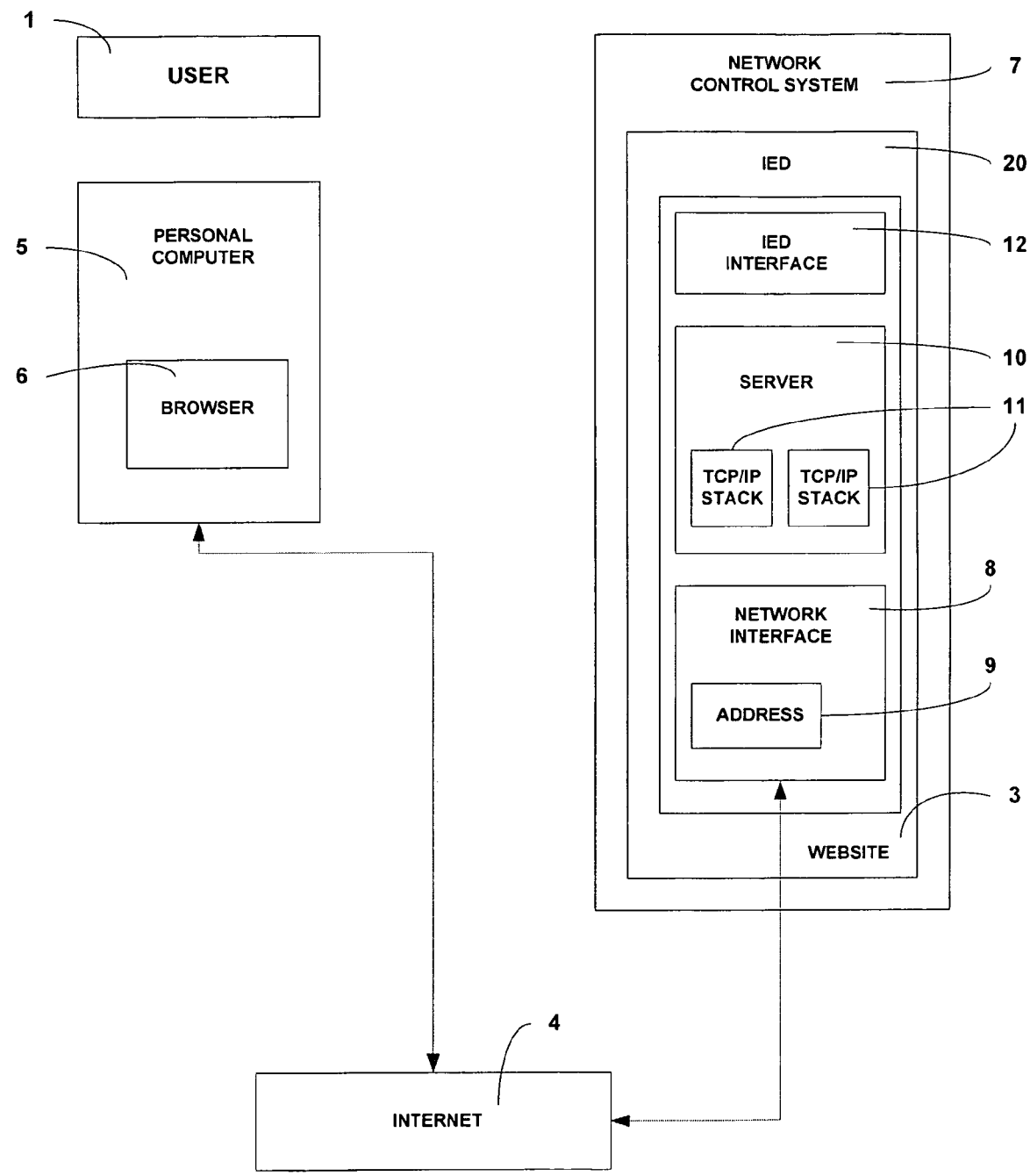
FIG. 2 is a block diagram illustrating the main features of an embedded Web site associated with an intelligent electronic device (IED), according to the present invention.

FIG. 2 is a block diagram illustrating the main features of an embedded Web site 3 associated with an IED 20. The Web site 3 includes a network interface 8 having a unique Internet address 9, a server 10, and an IED interface 12. The server 10 includes a hypertext transfer protocol (HTTP) interpreter and a FTP server and uses a Transmission Control Protocol (TCP) in conjunction with Internet Protocol through a Transmission Control Protocol/Internet Protocol (TCP/IP) stack 11 to interact with the network interface 8. This enables the transfer of data and files between the IED 20 and the user 1 through the Internet 4. The IED interface 12 exchanges information with the IED 20 and enables the server 10 to transfer/obtain data to/from the electrical network control system 7. The exchanged data can be used by the user at a remote location to monitor and control the process. The transferred files can be used (in a downloading direction) to update the operating software on the IEDs 20 which the control system is based on and to get measurements, events and disturbance/fault records (in an uploading direction). The TCP/IP stack 11 enables data transfers over the Internet 4 between the user 1 and the Web site 3 as required for the various layers specified by the IP protocol.

Figure 3:
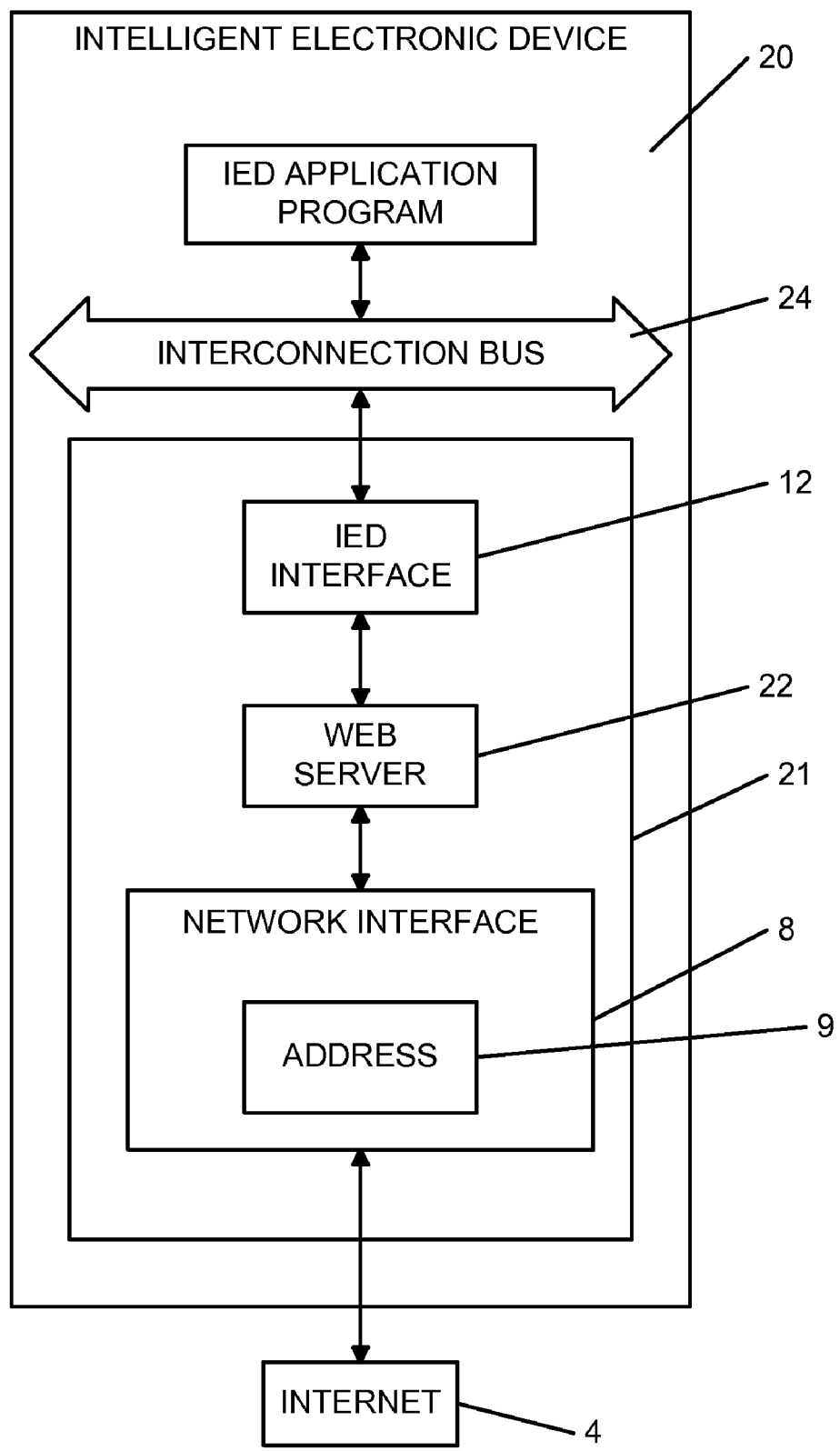
FIG. 3 is a block diagram of the present invention illustrating an Internet interface to an IED.

FIG. 3 is a block diagram of the present invention illustrating the Internet interface to an IED 20. The Web site 3 illustrated in FIGS. 1 and 2 is physically implemented on the Web interface module 21. The Web interface module 21 includes the network interface 8 having a unique Internet address 9 and a Web server 22. The Web server 22 provides the home page for the Web site 3. Security for the overall system can be included in the Web server 22, but is generally maintained as part of the network interface 8. A password and user list can be provided in initial configuration files stored in the Web server 22 and can be downloaded from a remote server. Protection of the configuration files I provided by the remote server and the Web server 22 through the password and the user list. By operably connecting the Web server 22 with the IED 20 through the interconnection bus 24, the Web server 22 provides a direct connection for the IED to the Internet 4.

An IED 20 is any device having a communication input and/or output capable of interfacing with the Web server 22 or other devices. The IED 20 refers to devices such as sensors, actuators, smart power equipment (e.g. intelligent circuit breakers, switch gears and power transformers), protection units, electronic meters, fault detectors, substation control units, RTUs and any other like device as well as traditional I/O modules for PLC systems.

The Web server 22 provides both a client and a server interface. All signals between the IED 20 and the Web server 22 are through the interconnection bus 24. The interconnection signals include addressing, control, data, and power. The client interface allows the IED to send commands to a remote note over the Internet, and the server interface allows for processing commands that originate from the remote note. Substantially real time control for the IED 20 from a remote HMI is possible by controlling the data flow through the Web server 22.

The Web server 22 functions as a node on the communication (TCP/IP) network 30 allowing it to send commands to the IED 20 and receive the responses. Although the TCP/IP network 30 of the preferred embodiment is an Ethernet network, other high level protocols can be used. A user can control and view configuration information and run-time data of the IED 20 through the Internet 4 by using a Web browser 6 at the remote location.

Figure 4:
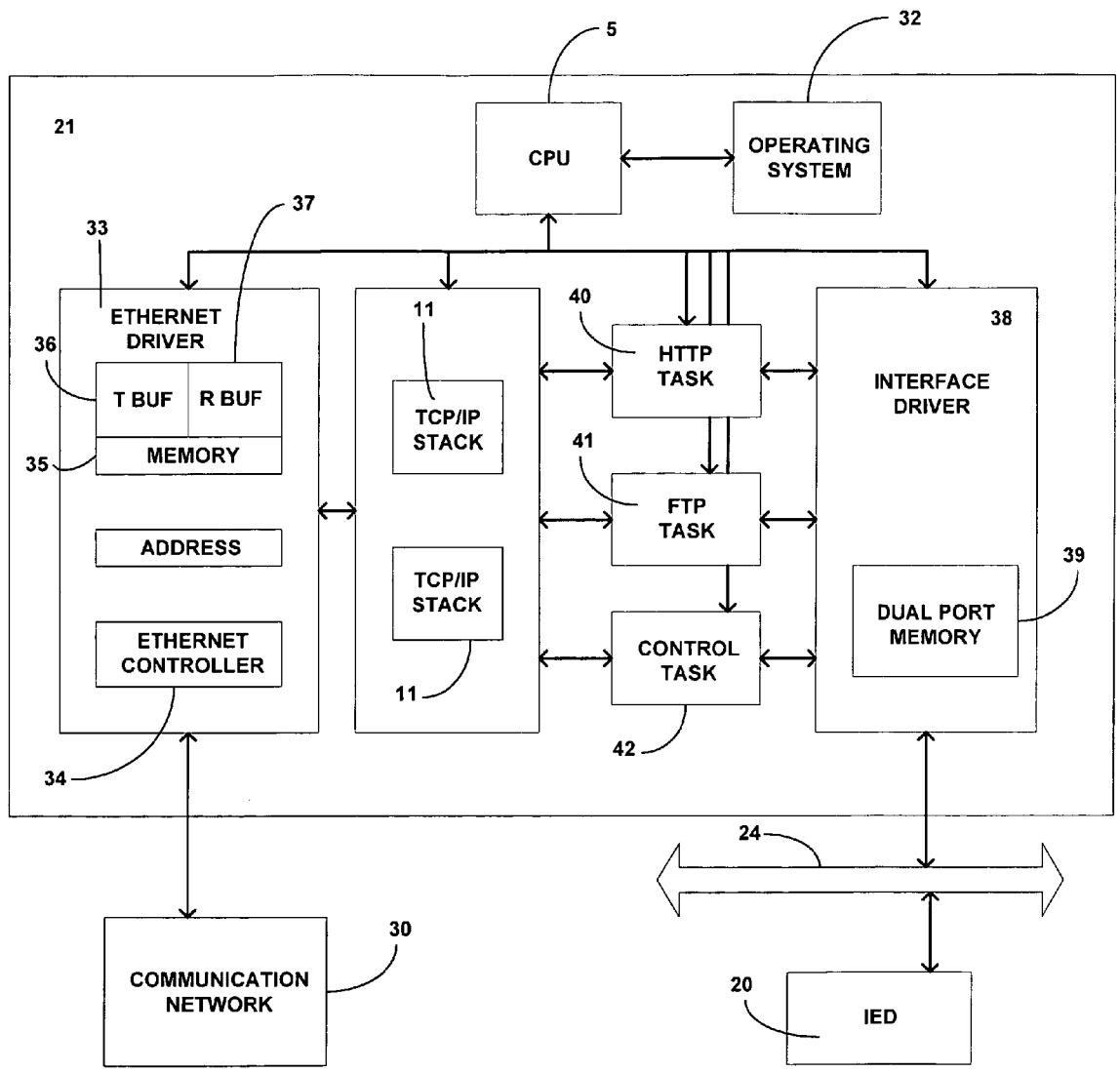
FIG. 4 is a block diagram of the Web server module illustrated in FIG. 2 according to the present invention; and, FIG. 5 is a block diagram of the present invention illustrating an IED operably connected to an SAS.

FIG. 4 is a block diagram illustrating the Web interface module 21 in greater detail. The Web interface module 21 includes various components to perform its functions: connection to the TCP/IP network 30, connection to the IED 20, and application functions (standard Web access, file transfer for software update and records uploading, and monitoring and control access to the IED).

Figure 5:
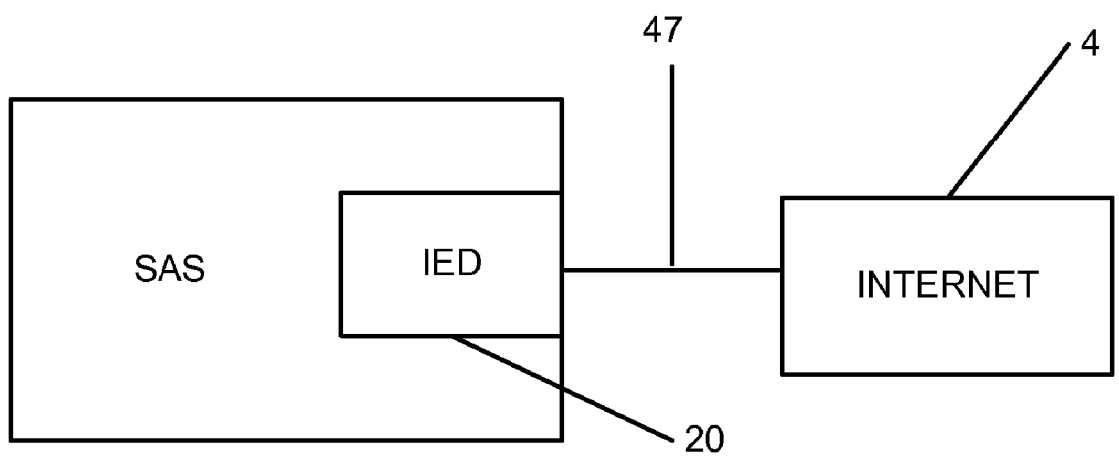

Connection to the TCP/IP network 30 is through a network driver 33. In the preferred embodiment of the present invention, to a SAS, the IED 20 is operably connected to an Ethernet local network and the network driver 33, is an Ethernet driver. FIG. 5 depicts the IED 20 operably connected to the SAS and the Internet 4. The connection to the Internet 4 is via an Ethernet connection 37. For a smaller control system such as a pole-top control system, the IED 20 may be connected via a phone modem to regular telephone wires. In this configuration, the Ethernet driver will be replaced by a PPP (Point-To-Point Protocol) or SLIP (Serial Line Internet Protocol) driver. The following description refers to the Ethernet option. The connection to the TCP/IP network 30 is through an Ethernet driver 33 and the connection to the IED 20 is through an interface driver 38. Standard Web access is provided by a HTTP server task 40. File transfer service is provided by a FTP server task 41. And monitoring and control access to the IED 20 is provided by a control task 42. Other possible protocols/interfaces include placing the signal on electrical power lines.

A substantially real time operating system (RTOS) 32 controls the interaction between the components. The RTOS 32 allocates processor time on a central processor unit (CPU) 31 to various tasks, provides memory management, and provides a set of message services and signal services. The message and signal services allow for communication between tasks, and between drivers and a task. The RTOS can be a custom design or commercially available, i.e., PSOS from ISI or VxWorks from Wind River Systems.

Connection to the TCP/IP network 30 is through an Ethernet driver 33 which transmits and receives messages at a rate of 10 Mb/s (megabits per second) or faster via an Ethernet controller 34. It is contemplated that in the future, Ethernet controllers 34 capable of speeds of 1 Gb/s (gigabits per second) and faster can be used. The physical connection over which communication is facilitated can be over a fiber optic cable or a twisted pair-type copper wire. Connection to the IED 20 is through an interface driver 38 which transmits and receives data via a dual port memory 39 and an interconnection bus 24.

In addition to provide a standard interface to a remote Web browser through the Internet 4, the interface module 21 also enables the IED 20 to exchange control messages with other IEDs or control units connected either on the local network 30, or on the Internet network 4 at a remote location. This communication is related to the control task 42 and will be processed using the industrial standard Modbus of TCP/IP. The TC/IP stack 11 must provide support for both broad range TCP/IP messages for the Internet World and Modbus control messages. Alternatively, the TCP/IP stack 11 can be replaced by a dual TCP/IP stack. The dual TCP/IP stack comprises a first TCP/IP stack that provides support for a broad range of TCP/IP messages (related to the HTTP task 40 and the FTP task 41). A second TCP/IP stack, a "smart stack," manages the high priority Modbus control messages (related to the control task 42). For outgoing TCP/IP messages, the appropriate TCP/IP stack is chosen by the calling HTTP, FTP or control tasks. For incoming TCP/IP messages, the TCP/IP message is intercepted and examined to determine its type. If the incoming message is a Modbus control message, the message is then delivered to the "smart stack." If the incoming message is not a Modbus control message, the first TCP/IP stack handles the message. In this manner, Modbus TCP/IP control messages are managed more quickly and efficiently than a non-Modbus control message managed by the single TCP/IP stack.

The Web interface module 21 has a unique global address 9 allowing it to be accessed by other devices on the network. The Ethernet driver 33 manages transmit 36 and receive 37 buffers in memory 35 and interfaces with the Ethernet controller 34. The transmit 36 and receive 37 buffers are shared both by the Ethernet controller 34 and the Ethernet driver 33. The Ethernet driver 33 also provides a transmit request interface and a receive indication interface to the TCP/IP stack 11. The Ethernet controller 34 provides a transmit queue interface, a receive queue interface, and generates interrupts on completion of transmitting a message and on receiving a new message. The Ethernet driver 33 places receive buffers in the receive queue. In the interrupt routine, the Ethernet driver 33 examines the receive queue. If any messages are in the receive queue, the Ethernet driver passes the receive buffer to the TCP/IP stack 11. The TCP/IP stack 11 copies the buffer and calls the Ethernet driver 33 to return the buffer and place the returned buffer back into the receive queue.

The TCP/IP stack 11 calls the Ethernet drive 33 to transmit a message. The Ethernet driver 33 allocates a buffer from the shared memory 35, copies the message into the buffer, and places the buffer into the Ethernet controller 34 transmit queue. In the interrupt routine, the Ethernet driver 33 examines the transmit queue, processes the transmission and frees the transmitted buffers.

The TCP/IP network 30 enables the IED 20 to exchange control messages with other IEDs or remote control units. In one direction, the control task 42 allows a remote application to issue a request command to the IED 20 and to receive its response. In the other direction, the control task 42 allows the IED 20 to send data to a remote application and to obtain responses.

The interface driver 38 provides a transmit request service to the IED 20 and receives indication services from the IED. The communication with the IED 20 is based on a dual port memory 39. The dual port memory 39 allows a full-duplex and bi-directional communication. The dual port memory 39 is split into two zones. One zone is dedicated to the incoming side for communication from the IED 20 and the other zone is dedicated to the outgoing side for communication to the IED 20. Writing to a specified location will cause an interrupt. For the incoming side, the IED 20 first writes a message in the dual port memory 39 and then triggers an interrupt. In the interrupt routine, the interface driver 38 reads the memory to get the message from the IED 20. According to the type of the message, the interface driver 39 uses a call back routine mechanism to pass the message to either the HTTP task 40, the FTP task 41 or the control task 42. For the outgoing side, the HTTP task 40, the FTP task 41 or the control task 42 call the interface driver 38 to transmit a message to the IED 20. The interface driver 38 writes the message in the dual port memory 39 and the triggers an interrupt to the IED processor.

The control task 42 processes a message originating from a control unit or another IED 20 at the remote location. The control task 42 interfaces with the interface driver 38, the TCP/IP stack 11, and the RTOS message services. The control task 42 calls the interface driver 38 and passes to it the message with a reference to the associated call back routine for the response. The call back routine uses the RTOS message services to send the response to the control task 42. A TCP/IP stack 11 signal function also uses the RTOS 32 IPC services to send a TCP/IP event to the control task 42. The control task 42 can handle multiple transactions and connections. The control task 42 maintains a list of connection machines and each connection machine contains a list of transaction machines. The connection machines manage the connection and the transaction machines manage the incoming messages and responses.

After performing an initialization, the control task 42 enters a loop and calls the RTOS 32 to receive a message. The RTOS 32 blocks the control task 42 until there is a message or there is a time out. The control task 42 either receives a message from the TCP/IP task's 11 signal handler from the interface driver 38 or it times out. The control task 42 processes the message or the time-out and reenters the loop. If the message received from the RTOS 32 is from the TCP/IP task's 11 signal handler, the control task 42 determines if the event is a connection request, a close socket event or a receive data event. Based on the TCP/IP event, the control task 42 uses the connection machine and transaction machine to advance the transaction. Received data for a message may occur over several receive data events and the transaction machine assembles the vents into a request message. When the response message is received from the RTOS 32, the control task 42 locates the connection and transaction machine to send the response.

When the control task 42 requests the TCP/IP stack 11 to transmit a message, not all of the message may be transmitted. This occurs when the remote node is flow controlled. In this case, the associated connection is placed into a blocked state. Every time the control task 42 calls the RTOS 32 to receive a message, it searches the list of connection machines that are flowed controlled. For each blocked connection, the control task 42 tries to advance the transaction state machines.

After the control task 42 has parsed the header of an incoming message, it attempts to allocate a structure to pass the message to the interface driver 38. If the control task 42 is already processing a predetermined number of outstanding messages, the attempt fails and the connection is placed into a blocked state. The body of the message is not read from the TCP/IP stack 11. As a result, the TCP/IP stack may apply flow control to the remote node. When one of the other messages is complete, the free data structure event causes a blocked connection machine to continue processing the incoming message.

The FTP task 41 enables file transfers with the IED 20 through the communicating network 30. The FTP task 41 interfaces with the TCP/IP stack 11 and the interface driver 38. The FTP task 41 receives a FTP request from the TCP/IP stack 11. To process the request, the FTP task 41 may access the IED 20 through the interface driver 38 and interconnection bus 24. The FTP task 42 sends back the response over the TCP/IP stack 11. A framework is supplied by the RTOS 32. The framework creates the FTP task, accepts connection, and parses the FTP request. After parsing the request, the framework calls the RTOS 32 to process the request. Processing the request involves determining the request type and processing the actual request. A subset of FTP is implemented in order to process file transfer operations. A download request allows a user to update the operating software of the IED 20. An uploaded request enables a user to get measurement, event and disturbance/fault records provided by the IED 20. The processing of TCP, FTP and HTTP stacks are well known in the industry.

The HTTP task 40 interfaces with the TCP/IP stack 11 and the interface driver 38. The HTTP server task 40 receives a HTTP request from the TCP/IP stack 11. To process the request, the HTTP task 40 may access the IED 20 through the interface driver and interconnection bus 24. The HTTP server task 40 sends back the response over the TCP/IP stack 11. The framework is supplied by the RTOS 32. The framework creates the HTTP task, accepts connection, and parses the HTTP request. After parsing the request, the framework calls the RTOS 32 to process the request. Processing the request involves determining the request type and processing the actual request. The different request types allow a user to acquire a snapshot of the IED 20 operations by allowing a view of various data within the IED 20. These request types also include: display of the IED 20 configuration; health statistics; readings; interconnection bus configuration; Ethernet configuration and statistics, and others. Images can be also displayed on the various HTML pages by means of an image file, e.g., a "gif file.

Table 1 shows the various HTML pages the user can access to:

TABLE 1

Home Page/Login

Readings
Parameters Setup
Quality Information
Monitoring and Diagnoses
IED Configuration and Statistics
Ethernet Configuration and Statistics
Security and Administration The Home Page contains hyperlinks to several pages of data. This page will display the identification of the IED 20. A user identification and password are required to access to the linked pages.

The Readings page can display run time data about the process, i.e., measurements: phase currents, voltages, tripping current, frequency, real and reactive power, energy counters, temperature, etc.;

status: circuit breaker open/close positions, earthing switch, protections enabled/disabled, recloser status, etc; and, events and alarms: alarm protection, tripping protections, pole pressure, Buchholtz, etc.

The Parameters Setup page can display the current value of the functions parameters, i.e., protecting tripping curve, threshold current, threshold voltage, tripping time delay, recloser activation mode, etc. The IED 20 may have several sets of parameters. This page enables the user to switch the active set to another defined parameters set. Access to this page is protected by a password.

The Quality information page can display voltage sag and swell, harmonics and wave captures.

The Monitoring and Diagnoses page can display information for network diagnosis and predictive maintenance, such as tripping current, cumulative breaking current, breaker opening/closing time, number of CB operations, disturbance records, etc.

The IED Configuration and Statistics page can display the configuration of the IED 20 and give diagnostics information for troubleshooting or performance analysis. In the case of a modular IED 20, the first page provides access to a series of linked pages related to the IED modules.

The Ethernet page can display information about the configuration of the Ethernet Network Interface 8. Diagnostic counters related to communication on the network can also displayed.

The Security and Administration page can enable an administrator to configure users' passwords and access rights, i.e., no access, view only access, full access; to another HTML.

The HTML pages provide a client/server user interface. This interface is performed by requests and responses exchanged between the browser 6 and the Web server 22. The RTOS 32 processes these requests and responds by receiving and sending HTTP messages through the TCP/IP stack 11. Processing some of these requests involves reading and writing within the IED 20. To perform these operations, the RTOS 32 sends a request to the interface driver 38 and uses an event signal mechanism and an event flag to determine when the request is complete. After sending the request to the interface driver 38, the RTOS 32 waits for an event flag to be sent. When the interface driver 38 completes the request, it calls a call back routine that sets the event flag. The RTOS 32 then resumes processing the request.

While the specific embodiments have been illustrated and described, numerous modifications are possible without departing from the scope or spirit of the present invention.

We claim:

1. An interface module for communicating messages with a remote location and to provide access to an at least one intelligent electronic device (IED) operably connected to a communication network, the interface module comprising:
   a central processing unit;
   an operating system operating the central processing unit;
   a network interface for communicating with the communication network;
   first and second TCP/IP protocol stacks for managing the communication on the network, wherein, in operation, each message is selectively assigned to one of the first and second protocol stacks according to a type of the message;
   a protocol task for processing the communication according to the protocol stacks, wherein messages assigned to the first protocol stack have a higher priority than messages assigned to the second protocol stack, wherein industrial protocol control messages are assigned to the first protocol stack;
   a set of application tasks communicating with the protocol task for responding to an incoming message from the communication network and initiating an outgoing message to the communication network; and,
   an interconnection bus with an interface driver for communicating with the at least one IED.

2. The interface module of claim 1 wherein the communication network is a worldwide Internet network using the Internet Protocol (IP).

3. The interface module of claim 2 operating as a Web site on the Internet, the interface module having a global IP address.

4. The interface module of claim 2 wherein the set of application tasks comprises a FTP server task for processing a File Transfer Protocol (FTP).

5. The interface module of claim 4 wherein the FTP server task accepts a connection; parses an FTP message; and, calls the operating system to process the FTP message.

6. The interface module of claim 5 wherein the FTP message allows a user at a remote location to download a file for updating the operating software within the at least one IED through the Internet.

7. The interface module of claim 5 wherein the FTP message allows a user at a remote location to upload a file for obtaining data records from the at least one IED through the Internet.

8. The interface module of claim 1 wherein the network interface is operably connected to a driver.

9. The interface module of claim 8 wherein the network interface is operably connected to an Ethernet driver.

10. The interface module of claim 8 wherein the network interface is operably connected to a SLIP/PPP driver.

11. The interface module of claim 1 wherein the set of application tasks includes a control task for processing the incoming and outgoing messages between a remote location and the at least one IED using an industrial communication standard Modbus over TCP/IP.

12. The interface of claim 1 wherein the set of application tasks comprises a HTTP server task for processing the Hypertext Transport Protocol (HTTP) to provide a standard Web access to a remote Web browser.

13. The interface module of claim 12 wherein the HTTP server task accepts a connection; parses an HTTP message; and, calls the operating system to process the HTTP message.

14. The interface module of claim 13 wherein the HTTP message allows a user at a remote location to view data within the at least one IED from the browser operably connected to the communication network.

15. The interface module of claim 13 wherein the HTTP message allows a user at a remote location to write data within the at least one IED from the browser operably connected to the communication network.

16. The interface module of claim 1 wherein the second TCP/IP protocol stack is capable of handling a broad range of TCP/IP messages and the first TCP/IP protocol stack is capable of handling a less broad range of TCP/IP messages more quickly than the first stack is capable of handling the broad range of TCP/IP messages.

17. An interface module for communicating messages with a remote location and to provide access to an at least one intelligent electronic device (IED) operably connected to a communication network, the interface module comprising:
    a central processing unit;
    an operating system operating the central processing unit;
    a network interface for communicating with the communication network;
    a dual TCP/IP protocol stack comprising a first and second stacks for managing the communication on the network, wherein, in operation, messages are selectively assigned to one of the first and second stacks according to a type of the respective message, wherein Modbus control messages are assigned to the first protocol stack;
    a protocol task for processing the communication according to the dual protocol stack; and
    a set of application tasks, comprising a control task and communicating with the protocol task for responding to an incoming message from the communication network and initiating an outgoing message to the communication network using an industrial communication standard Modbus over TCP/IP, wherein the control task accepts a connection, parses a Modbus message, and calls the operation system to process the Modbus message.

18. The interface module of claim 17 wherein the control task comprises means for processing the Modbus message; accessing data on the at least one IED;
and, sending back a response.

19. The interface of claim 18 wherein the control task further includes means for initiating the Modbus message allowing the at least one IED to communicate with the interface module.

20. A control system for allowing a user access at a remote location through a communication network, to information and data contained in an electrical network control system having an at least one intelligent electronic device (IED), the control system comprising:
    means for coupling the remote location to the communication network, the coupling means including a Web browser for interacting with the communication network;
    a Web site associated with the electrical network control system and accessible through the communication network;
    means for linking the electrical network control system to the Web site, the linking means including an interface module for coupling the at least one IED to the communication network;
    first and second TCP/IP protocol stacks for enabling transfer of a message between the remote location and the electrical network control system, wherein, in operation, the message is selectively assigned to one of the first and second protocol stacks according to a type of the message; and
    means for processing the message received from the remote location over the communication network wherein a message assigned to the first protocol stack has a higher priority than a message assigned to the second protocol stack, wherein industrial protocol control messages are assigned to the first protocol stack; the means for processing the message comprising means for receiving a message; means for accessing the at least one IED for the message; and, means for sending a response to the remote location through the communication network.

21. The control system of claim 20 wherein the communication network is a worldwide Internet network using an Internet Protocol (IP).

22. The control system of claim 20 wherein the interface module operates as a Web site on the Internet, the interface module having a global IP address.

23. The control system of claim 22 wherein the interface module comprises a network driver for receiving the message from the Web browser on the Internet and for sending a response back to the Web browser.

24. The control system of claim 23 wherein the message transfer enabling means comprises a protocol task using a Transmission Control Protocol (TCP).

25. The control system of claim 24 wherein the first and second TCP/IP stack comprises one stack capable of handling TCP/IP messages with a higher priority than the other stack.

26. The control system of claim 25 wherein the message processing means comprises a control task for processing a message exchange over the communication network between a remote application and the at least one IED using the industrial communication standard Modbus over TCP/IP.

27. The control system of claim 25 wherein the data message processing means includes a FTP server task for processing a File Transfer Protocol (FTP).

28. The control system of claim 27 wherein the FTP server task accepts a connection; parses an FTP message; and, calls the operating system to process the FTP message.

29. The control system of claim 28 wherein the FTP message allows a user at the remote location to download a file through the Internet for updating the operating software within the at least one IED associated with the electrical network control system.

30. The control system of claim 29 wherein the FTP message allows a user at the remote location to upload through the Internet a file for obtaining data records from the at least one IED associated with the electrical network control system.

31. The control system of claim 25 wherein the data message processing means includes a HTTP server task for processing a Hypertext Transport Protocol (HTTP) to provide access to the remote Web browser.

32. The control system of claim 31 wherein the HTTP task accepts a connection; parses an HTTP message; and, calls the operating system to process the HTTP message.

33. The control system of claim 32 wherein the HTTP message allows a user at the remote location to view the electrical network control system from a browser connected to the Internet.

34. The control system of claim 33 wherein the HTTP message allows a user at the remote location to write to the electrical network control system from a browser connected to the Internet.

35. The control system of claim 33 wherein the HTTP message allows a user at the remote location to write IED data from a browser connected to the Internet.

36. The control system of claim 33 wherein a Java message allows a user at the remote location to write IED data from a browser connected to the Internet.

37. The control system of claim 33 wherein an ActiveX message allows a user at the remote location to write IED data from a browser connected to the Internet.

38. The control system of claim 32 wherein the HTTP message allows a user at the remote location to view IED data from a browser connected to the Internet.

39. The control system of claim 32 wherein a Java message allows a user at the remote location to view IED data from a browser connected to the Internet.

40. The control system of claim 32 wherein an ActiveX message allows a user at the remote location to view IED data from a browser connected to the Internet.

41. A control system for allowing a user access at a remote location through a communication network, to information and data contained in an electrical network control system having an at least one intelligent electronic device IED), the control system comprising:

means for coupling the remote location to the communication network, the coupling means including a Web browser for interacting with the communication network;

a Web site associated with the electrical network control system and accessible through the communication network;

means for linking the electrical network control system to the Web site, the linking means including an interface module for coupling the at least one IED to the communication network;

first and second TCP/IP protocol stacks for enabling transfer of a message between the remote location and the electrical network control system, wherein, in operation, the message is selectively assigned to one of the first and second protocol stacks according to a type of the message, wherein Modbus control messages are assigned to the first protocol stack; and means for processing the message received from the remote location over the communication network, the means for processing the message comprising a control task, means for receiving a message; means for accessing the at least one IED for the message; and, means for sending a response to the remote location through the communication network using an industrial communication standard Modbus over TCP/IP, wherein the control task accepts a connection, parses a Modbus message, and calls an operation system to process the Modbus message.

42. The control system of claim 41 wherein the control task includes means for processing the message received from the remote location over the communication network; accessing data on the at least one IED; and, sending back a response.

43. The control system of claim 42 wherein the control task further includes means for initiating the message allowing the IED to communicate with the remote location over the communication network.

* * * * *